(12) United States Patent
Ryu et al.

(10) Patent No.: US 9,005,743 B2
(45) Date of Patent: Apr. 14, 2015

(54) POLARIZING PLATE, METHOD FOR PRODUCING SAME AND IMAGE DISPLAY DEVICE COMPRISING SAME

(75) Inventors: Jin-Young Ryu, Daejeon (KR); Young-Jun Hong, Daejeon (KR); Soon-Yeol Lee, Daejeon (KR); Woo-Sung Kim, Daejeon (KR); Han-Na Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 140 days.

(21) Appl. No.: 13/515,948

(22) PCT Filed: Dec. 15, 2010

(86) PCT No.: PCT/KR2010/008970
§ 371 (c)(1), (2), (4) Date: Jun. 14, 2012

(87) PCT Pub. No.: WO2011/074871
PCT Pub. Date: Jun. 23, 2011

(65) Prior Publication Data
US 2012/0308798 A1    Dec. 6, 2012

(30) Foreign Application Priority Data

Dec. 15, 2009  (KR) .................. 10-2009-0124757

(51) Int. Cl.
*B32B 27/30*   (2006.01)
*B05D 5/06*   (2006.01)
(Continued)

(52) U.S. Cl.
CPC ................. *G02B 5/3033* (2013.01); *G02B 1/04* (2013.01)

(58) Field of Classification Search
CPC ........ G02B 1/04; G02B 5/3033; C08L 25/08; C08L 33/08; C08L 33/10; C08L 35/06
See application file for complete search history.

(56) References Cited

U.S. PATENT DOCUMENTS

2003/0004221 A1* 1/2003 Sakurai et al. .................. 522/15
2007/0237966 A1* 10/2007 Takao et al. ................ 428/423.1
(Continued)

FOREIGN PATENT DOCUMENTS

JP   2003-147017 A   5/2003
JP   2008-32763 A    2/2008
(Continued)

OTHER PUBLICATIONS

"UV-1700B". Nippon Gohsei, Retrieved Feb. 24, 2013.*
(Continued)

*Primary Examiner* — Prashant J Khatri
(74) *Attorney, Agent, or Firm* — McKenna Long & Aldridge LLP

(57) ABSTRACT

The present invention relates to a polarizing plate, a method for producing the same, and an image display device comprising the same, and more specifically to a polarizing plate which is characterized by comprising: a) a polarizer, b) a hardening resin layer which is provided on at least one side of the polarizer and formed from a photocurable composition comprising: 4 to 95 parts by weight of (A) a photocurable acrylic polymer, 4 to 95 parts by weight of (B) a poly-functional acrylic monomer, and 1 to 20 parts by weight of (C) a photo-polymerization initiator, based on 100 parts by weight of the photocurable composition, a method for manufacturing the same, and an image display device using the same. According to the present invention, a polarizing plate, which exhibits excellent polarizing properties and durability, has high surface hardness, and may be formed as a thin plate, may be provided.

15 Claims, 1 Drawing Sheet

(51) Int. Cl.
 *B32B 5/00* (2006.01)
 *G02B 5/30* (2006.01)
 *G02B 1/04* (2006.01)

(56) References Cited

U.S. PATENT DOCUMENTS

2008/0026182 A1* 1/2008 Abe et al. .................. 428/141
2010/0129568 A1   5/2010 Kim et al.

FOREIGN PATENT DOCUMENTS

| JP | 20099288413 A | 10/2009 |
| JP | 2009-282364 A | 12/2009 |
| KR | 10-2008-0039740 | 5/2008 |
| KR | 10-2008-0073883 | 8/2008 |
| KR | 10-2008-0073883 A | 8/2008 |
| KR | 10-2009-0003701 | 1/2009 |
| KR | 10-2009-0003701 A | 1/2009 |
| WO | WO 2008153143 A1 | 12/2008 |

OTHER PUBLICATIONS

"Ciba IGRACURE 184". Ciba Specialty Chemicals, Inc., (2001); pp. 1-3.*

* cited by examiner

POLARIZING PLATE, METHOD FOR PRODUCING SAME AND IMAGE DISPLAY DEVICE COMPRISING SAME

This application is a national stage application of PCT/KR2010/008970, filed Dec. 15, 2010, which claims priority from Korean Patent Application No. 10-2009-0124757, filed on Dec. 15, 2009 in the KIPO, the disclosures of which are incorporated herein by reference in their entireties.

TECHNICAL FIELD

The present invention relates to a polarizing plate, a method for producing the same and an image display device using the same.

BACKGROUND ART

A polarizing plate is composed of a multilayered plastic optical film and provided on front and rear sides of a liquid crystal panel, and among these optical films, a polyvinyl alcohol (PVA) polarizing film on which a polarizing medium such as iodine, a dye, and the like is adsorbed, which is the essential part of the polarizing plate. The PVA polarizing film exhibits excellent polarizing properties, but has weak durability to temperature, humidity, and light, and thus protective films for protecting the PVA polarizing film need to be adhered to both sides of the PVA so as to complement the strength and durability.

Recently, polarizing plate protective films have a tendency to be developed as a high functional type having several simultaneous functions, and have been developed as an integrated type polarizing plate protective film having simultaneous functions such as hard coat treatment, anti-glare coating, anti-reflection coating, and the like, thereby realizing formation of a thin plate and price competitiveness. In particular, the use of the image liquid crystal device has been recently broadened the device in various fields, and thus interests in improving hardness of the polarizing plate and formation of the thin plate have been increasing.

DETAILED DESCRIPTION OF THE INVENTION

Technical Problem

An object of the present invention is to provide a polarizing plate which has excellent polarizing properties, durability and surface hardness, and which may be formed as a thin plate, and a method for producing the same, in order to solve problems in the related art.

Further, another object of the present invention is to provide an image display device including the polarizing plate.

Technical Solution

In order to achieve the object, the present invention provides a polarizing plate, including:
a) a polarizer, and
b) a hardening resin layer which is provided on at least one side of the polarizer and formed from a photocurable composition including: 4 to 95 parts by weight of (A) a photocurable acrylic polymer, 4 to 95 parts by weight of (B) a poly-functional acrylic monomer, 1 to 20 parts by weight of (C) a photo-polymerization initiator, and 0 to 50 parts by weight of (D) a photocurable oligomer, based on 100 parts by weight of the photocurable composition.

Further, the present invention provides a method for manufacturing a polarizing plate, including:
a) preparing a photocurable composition including: 4 to 95 parts by weight of (A) a photocurable acrylic polymer, 4 to 95 parts by weight of (B) a poly-functional acrylic monomer, and 1 to 20 parts by weight of (C) a photo-polymerization initiator, based on 100 parts by weight of the photocurable composition; and
b) using the prepared photocurable composition to directly form a hardening resin layer on at least one side of the polarizer.

Prior to step a), preparing (A) the photocurable acrylic polymer may be further included.

In addition, the present invention provides a method for manufacturing a polarizing plate, including:
a) preparing a photocurable composition including: 4 to 95 parts by weight of (A) a photocurable acrylic polymer, 4 to 95 parts by weight of (B) a poly-functional acrylic monomer, and 1 to 20 parts by weight of (C) a photo-polymerization initiator, based on 100 parts by weight of the photocurable composition; and
b) including an adhesive layer to form a hardening resin layer prepared from the prepared photocurable composition on at least one side of the polarizer.

Prior to step a), preparing (A) the photocurable acrylic polymer may be further included.

In the present invention, (A) the photocurable acrylic polymer includes preferably an acryloyl functional group, and more preferably (a) an acrylate-based monomer, (b) an aromatic vinyl-based monomer, and (c) an N-substituted maleimide-based monomer and an acryloyl functional group.

Furthermore, the present invention provides an image display device including the polarizing plate according to the present invention.

Advantageous Effects

According to the present invention, a polarizing plate which exhibits excellent polarizing properties and durability, has high surface hardness and may be formed as a thin plate, may be provided. Further, an image display device including the polarizing plate according to the present invention, which has excellent physical properties such as polarizing properties, and the like, may be provided.

BEST MODE

Figure 1:
FIG. 1 is a schematic view illustrating the structure of a polarizing plate according to an exemplary embodiment of the present invention (1: polarizer and 3: hardening resin layer).

Hereinafter, the present invention will be described in detail.

A polarizing plate according to the present invention is characterized by a polarizing plate including a) a polarizer and b) a hardening resin layer which is provided on at least one side of the polarizer and formed from a photocurable composition including: 4 to 95 parts by weight of (A) a photocurable acrylic polymer, 4 to 95 parts by weight of (B) a poly-functional acrylic monomer, and 1 to 20 parts by weight of (C) a photo-polymerization initiator, based on 100 parts by weight of the photocurable composition.

<Polarizer>

As the polarizer used in the present invention, any polarizer may be appropriately selected and used so long as the polarizer may achieve the object of the present invention. Although it is not particularly limited in the present invention, PVA films may be preferably used.

<Manufacture of Hardening Resin Layer>

The hardening resin layer according to the present invention is characterized by being formed from a photocurable composition including: 4 to 95 parts by weight of (A) a photocurable acrylic polymer, 4 to 95 parts by weight of (B) a poly-functional acrylic monomer, 1 to 20 parts by weight of (C) a photo-polymerization initiator, and 0 to 50 parts by weight of (D) a photocurable oligomer, based on 100 parts by weight of the photocurable composition.

(A) The photocurable acrylic polymer includes (a) an acrylate-based monomer, (b) an aromatic vinyl-based monomer, and (c) an acryloyl functional group which may participate in reactions during an ultraviolet (UV) hardening as a polymer including an N-substituted maleimide-based monomer. Here, it is to be understood that monomers to be included in a polymer mean that double bonds of the monomers are polymerized so as to be bound to the structure of the polymer.

(A) The photocurable acrylic polymer is preferably included in an amount of 4 to 95 parts by weight based on 100 parts by weight of the photocurable composition which forms a hardening resin layer.

It is preferred that (A) the photocurable acrylic polymer has a weight average molecular weight in the range of 10,000 g/mol to 200,000 g/mol. If (A) the photocurable acrylic polymer has a weight average molecular weight of less than 10,000 g/mol, a film may not be formed well and the film has brittleness, which is not preferred. If the weight average molecular weight is too high, a desired level of hardness of the film may not be obtained.

It is preferred that (A) the photocurable acrylic polymer includes an acryloyl functional group which may participate in reactions during an ultraviolet (UV) hardening, and the acryloyl functional group is included in an amount of 5 to 90 parts by weight based on 100 parts by weight of the photocurable acrylic polymer. (a) The acrylate-based monomer is preferably selected from the group consisting of alkyl acrylates such as ethyl acrylate, and the like; alkyl methacrylates such as methyl methacrylate, glycidyl methacrylate, benzyl methacrylate, and the like; and mixtures thereof, and (a) the acrylate-based monomer is preferably included in an amount of 30 to 98 parts by weight based on 100 parts by weight of (A) the photocurable acrylic polymer.

(b) The aromatic vinyl-based monomer is preferably selected from the group consisting of styrene, methyl styrene, and mixtures thereof, and (b) the aromatic vinyl-based monomer is preferably included in an amount of 1 to 30 parts by weight based on 100 parts by weight of (A) the photocurable acrylic polymer.

(c) The N-substituted maleimide-based monomer is preferably selected from the group consisting of N-methyl maleimide, N-ethyl maleimide, N-n-propyl maleimide, N-isopropyl maleimide, N-n-butyl maleimide, N-s-maleimide, N-t-maleimide, N-n-hexyl maleimide, N-n-dodecyl maleimide, N-allyl maleimide, N-benzyl maleimide, N-cyclohexyl maleimide, N-phenyl maleimide, N-nitrophenyl maleimide, N-hydroxymaleimide, N-methoxymaleimide, N-ethoxymaleimide, N-monochlorophenyl maleimide, N-dichlorophenyl maleimide, N-monomethylphenyl maleimide, N-dimethylphenyl maleimide, and N-ethylphenyl maleimide, and more preferably N-cyclohexyl maleimide and N-phenyl maleimide. (c) The N-substituted maleimide-based monomer is preferably included in an amount of 1 to 40 parts by weight based on 100 parts by weight of (A) the photocurable acrylic polymer.

(B) The poly-functional acrylic monomer means a monomer including one or more acrylate functional groups, which may participate in reactions during an ultraviolet (UV) hardening, and the kinds thereof are not particularly limited and those typically used in the art to which the present invention pertains may be selected and used. Specifically, it is preferably selected from the group consisting of dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, and trimethylopropane ethoxy triacrylate, and (B) the poly-functional acrylic monomer is preferably included in an amount of 4 to 95 parts by weight based on 100 parts by weight of the photocurable composition forming the hardening resin layer.

As (C) the photo-polymerization initiator, photo-polymerization initiators typically used in the art are used and are not particularly limited in the present invention. Specifically, chloroacetophenone, diethoxy acetophenone, hydroxy acetophenone (Brand Name: Darocure 1173, Irgacure 184, and the like), α-amino acetophenone (Brand Name: Irgacure-907, and the like), benzoin ether, benzyl dimethyl ketal (Brand Name: Irgacure-651, and the like), benzophenone, thioxanthone, 2-ethylanthraquinone (2-ETAQ), and the like may be used, and may be selected and used according to the wavelength range of a UV lamp to be used.

(C) The photo-polymerization initiator is preferably included in an amount of 1 to 20 parts by weight based on 100 parts by weight of a photocurable composition which forms a hardening resin layer.

(D) The photocurable oligomer refers to an oligomer including at least one acrylate functional group which may participate in reactions during a ultraviolet (UV) hardening, and the kinds thereof are not particularly limited, but specifically urethane acrylate oligomers, acrylic acrylate oligomers, and the like may be used.

(D) The photocurable oligomer is preferably included in an amount of 0 to 50 parts by weight based on 100 parts by weight of a photocurable composition which forms a hardening resin layer.

(D) The photocurable oligomer preferably has a weight average molecular weight in the range of 1,000 g/mol to 100,000 g/mol.

The photocurable composition may further include a solvent. As the solvent, solvents known in the art may be used. For example, methyl ethyl ketone and the like may be used. The amount of solvent used may be easily determined by those skilled in the art considering the coatability, processibility, and the like.

<Manufacture of Polarizing Plate and Image Display Device>

A polarizing plate according to an exemplary embodiment of the present invention includes the polarizer and the hardening resin layer, and is characterized in that the hardening resin layer is formed on at least one side of the polarizer (FIG. 1).

Figure 2:
FIG. 2 is a schematic view illustrating the structure of a polarizing plate according to an exemplary embodiment of the present invention (1: polarizer, 2: adhesive layer, and 3: hardening resin layer).

Further, a polarizing plate according to another exemplary embodiment of the present invention is characterized in that the polarizing plate is manufactured by using an adhesive at least one side of the polarizer to laminate a film formed by using the photocurable composition (FIG. 2). At this time, the film formed by using the photocurable composition may be coated and formed on a separate release film.

The hardening resin layer may have a thickness of 0.1 μm to 50 μm, preferably 5 μm to 30 μm, and more preferably 10 μm to 20 μm.

As described above, the thickness of the hardening resin layer may be controlled within the range, and thus the polarizing plate according to the present invention may achieve a thickness up to a range of 60 μm to 70 μm.

As the adhesive, those typically used in the art may be used and are not particularly limited in the present invention.

An image display device according to the present invention is characterized by including the polarizing plate according to the present invention. When the image display device includes the polarizing plate according to the present invention, an image display device, which has excellent physical properties such as polarizing properties, durability, and the like, may be provided. The image display device according to the present invention does not have any limitation in other portions, except for including the polarizing plate according to the present invention. For example, the image display device may have a configuration including a liquid crystal cell and two polarizing plates provided on both sides of the liquid crystal cell, and at least one of the polarizing plates may be a polarizing plate according to the present invention. The image display device may further include an optical film such as a backlight unit, a retardation film, or the like.

MODE FOR INVENTION

The present invention will be described in more detail through the following Examples. However, these Examples are only illustrative and are not intended to limit the technical scope of the present invention.

[Evaluation of Physical Properties]

*Thickness Measurement; measured by using a digital micrometer.

*Pencil Hardness Measurement; A pencil scratch value on the surface of a hardening resin layer was measured by using pencils having different hardness.

EXAMPLE

Example 1

Preparation of (A) Photocurable Acrylic Polymer 60 g of methyl methacrylate, 30 g of glycidyl methacrylate, 5 g of styrene, 5 g of N-cyclohexyl maleimide and 0.2 g of n-dodecyl mercaptan, and 233 g of methyl isobutyl ketone as an organic solvent were mixed, then 0.3 g of azobisisobutyronitrile was introduced into the resulting reaction solution when the internal temperature of the solution reached 65° C., and then the mixture was subjected to polymerization reaction for 18 hr. 0.1 g of 4-t-butylpyrocatechol as a polymerization inhibitor was introduced thereto to complete the reaction and obtain a polymer with a yield of 99%. 15 g of acrylic acid and 0.1 g of dimethyl aminopyridine were introduced into the polymer thus obtained and left to react at a temperature of 110° C. for 18 hr to prepare a photocurable acrylic polymer (weight average molecular weight 80,000 g/mol) including an acryloyl functional group.

Preparation of (B) Photocurable Composition (Hard Coating Composition)

40 g of (A) the photocurable acrylic polymer prepared above, 60 g of pentaerythritol triacrylate, 20 g of an urethane acrylate oligomer RS27-921 (DIC Corp.), 1.5 g of hydroxy acetophenone (Darocure 1173), 2.4 g of hydroxy acetophenone (Irgacure 184), and 1.9 g of α-amino acetophenone (Irgacure 907) as photo-polymerization initiators, and 89 g of methyl ethyl ketone as an organic solvent were mixed to prepare a photocurable composition (hard coating composition).

Manufacture of (C) Polarizing Plate

The hard coating composition prepared above was coated on a PET release film (50 μm) in a bar coating mode so as to have a dry thickness of 15 μm. The coated film was dried in an oven at 90° C. for 3 min and then irradiated by using a high pressure mercury lamp under nitrogen atmosphere so as to have an accumulated light amount of 610 mJ/cm².

The hard coating film prepared above was laminated on both sides with a polarizer PVA film by using an adhesive. Each film was bound together, and then a polarizing plate having a multilayer film thickness of 65 μm was formed.

A pencil hardness on the surface of a hardening resin layer of the polarizing plate manufactured above was 4H, and after storage at room temperature for 24 hr, no cracks and curls were observed on the surface of the hardening layer.

Example 2

(A) A photocurable acrylic polymer and (B) a photocurable composition (hard coating composition were prepared in the same manner as in Example 1.

Manufacture of (C) Polarizing Plate

The photocurable composition (hard coating composition) prepared in (B) above was coated on a polarizer PVA film in a bar coating mode so as to have a dry thickness of 15 μm. The coated film was dried in an oven at 90° C. for 3 min and then irradiated by using a high pressure mercury lamp under nitrogen atmosphere so as to have an accumulated light amount of 610 mJ/cm².

The process was performed in the same manner as in Example 1, except that coating was performed in a double side printing mode to form a polarizing plate having a film thickness of 65 μm.

A pencil hardness on the surface of a hardening resin layer of the polarizing plate manufactured above was 5H, and after storage at room temperature for 24 hr, no cracks and curls were observed on the surface of the hardening layer.

Example 3

Preparation of (A) Photocurable Acrylic Polymer

The process was performed in the same manner as in Example 1.

Preparation of (B) Photocurable Composition (Hard Coating Composition)

The process was performed in the same manner as in Example 1, except that 40 g of (A) the photocurable acrylic polymer prepared in Example 1 and 60 g of pentaerythritol triacrylate were applied and the urethane acrylate oligomer was not used (FIG. 1).

Manufacture of (C) Polarizing Plate

The process was performed in the same manner as in Example 1, and as a result, a polarizing plate having a multilayered film thickness of 65 μm was formed.

A pencil hardness on the surface of a hardening resin layer of the polarizing plate manufactured above was 4H, and after storage at room temperature for 24 hr, no cracks and curls were observed on the surface of the hardening layer.

Example 4

Preparation of (A) Photocurable Acrylic Polymer 60 g of methyl methacrylate, 30 g of glycidyl methacrylate, 5 g of styrene, 5 g of N-phenyl maleimide, and 0.2 g of n-dodecyl mercaptan and 233 g of methyl isobutyl ketone as an organic solvent were mixed, then 0.3 g of azobisisobutyronitrile was introduced into the resulting reaction solution when the internal temperature of the solution reached 65° C., and then the mixture was subjected to polymerization reaction for 18 hr. 0.1 g of 4-t-butylpyrocatechol as a polymerization inhibitor was introduced thereto to complete the reaction and obtain a polymer with a yield of 99%.

15 g of acrylic acid and 0.1 g of dimethyl aminopyridine were introduced into the polymer thus obtained and left to react at a temperature of 110° C. for 18 hr to prepare a photocurable acrylic polymer including an acryloyl functional group.

Preparation of (B) Photocurable Composition (Hard Coating Composition)

The process was performed in the same manner as in Example 1.

Manufacture of (C) Polarizing Plate

The process was performed in the same manner as in Example 1. A pencil hardness on the surface of a hardening resin layer of the polarizing plate manufactured above was 4H, and after storage at room temperature for 24 hr, no cracks and curls were observed on the surface of the hardening layer.

Comparative Example 1

Preparation of (B) Hard Coating Composition and (C) Polarizing Plate

Unlike in Example 1, the process was performed in the same manner as in Example 1, except that (A) the photocurable acrylic polymer was not applied and 60 g of an urethane acrylate oligomer RS27-921 (DIC Corp.) and 40 g of pentaerythritol triacrylate were applied, and as a result, a polarizing plate having a thickness of 65 μm was formed.

A pencil hardness on the surface of a hardening resin layer of the polarizing plate manufactured above was 2H, and after storage at room temperature for 24 hr, cracks and curls were observed on the surface of the hardening layer.

Comparative Example 2

Preparation of (B) Hard Coating Composition and (C) Polarizing Plate

Unlike in Example 1, the process was performed in the same manner as in Example 1, except that (A) the photocurable acrylic polymer and the urethane acrylate oligomer were not applied and 60 g of pentaerythritol triacrylate and 40 g of dipentaerythritol hexaacrylate were applied, and as a result, a polarizing plate having a thickness of 65 μm was formed.

A pencil hardness on the surface of a hardening resin layer of the polarizing plate manufactured above was 3H, and after storage at room temperature for 24 hr, cracks and curls were observed on the surface of the hardening layer.

As reviewed above, it was seen that a polarizing plate using the photocurable composition according to the present invention had excellent surface hardness and a thinner thickness, compared to polarizing plates prepared in the Comparative Examples, and the effects thereof were excellent, in that no cracks and curls were generated on the surface of the hardening layer.

Although the present invention has been described in detail with reference to specific examples described above, it is apparent to those skilled in the art that various changes and modifications can be made within the technical spirit and scope of the present invention, and these changes and modifications also naturally belong to the claims attached.

The invention claimed is:

1. A polarizing plate, comprising:
   a) a polyvinyl alcohol polarizer and
   b) a hardening resin layer which is provided on at least one side of the polyvinyl alcohol polarizer and formed from a photocurable composition comprising: 4 to 95 parts by weight of (A) a photocurable acrylic polymer, 4 to 95 parts by weight of (B) a poly-functional acrylic monomer, and 1 to 20 parts by weight of (C) a photo-polymerization initiator, based on 100 parts by weight of the photocurable composition,
   wherein (A) the photocurable acrylic polymer comprises (a) an acrylate-based monomer, (b) an aromatic vinyl-based monomer, (c) an N-substituted maleimide-based monomer, and an acryloyl functional group,
   wherein (A) the photocurable acrylic polymer comprises 30 to 98 parts by weight of (a) the acrylate-based monomer based on 100 parts by weight of (A) the photocurable acrylic polymer,
   wherein (A) the photocurable acrylic polymer comprises 1 to 30 parts by weight of (b) the aromatic vinyl-based monomer based on 100 parts by weight of (A) the photocurable acrylic polymer, and
   wherein (A) the photocurable acrylic polymer comprises 1 to 40 parts by weight of (c) the N-substituted maleimide-based monomer based on 100 parts by weight of (A) the photocurable acrylic polymer.

2. The polarizing plate of claim 1, wherein the hardening resin layer is formed from 4 to 90 parts by weight of (A) a photocurable acrylic polymer, 4 to 90 parts by weight of (B) a poly-functional acrylic monomer, 1 to 20 parts by weight of (C) a photo-polymerization initiator, and 0 to 50 parts by weight of (D) a photocurable oligomer based on 100 parts by weight of the photocurable composition.

3. The polarizing plate of claim 2, wherein (D) the photocurable oligomer has a weight average molecular weight of 1,000 g/mol to 100,000 g/mol.

4. The polarizing plate of claim 1, wherein (A) the photocurable acrylic polymer has a weight average molecular weight of 10,000 g/mol to 200,000 g/mol.

5. The polarizing plate of claim 1, wherein (A) the photocurable acrylic polymer comprises 5 to 90 parts by weight of the acryloyl functional group based on 100 parts by weight of the (A) photocurable acrylic polymer.

6. The polarizing plate of claim 1, wherein (a) the acrylate-based monomer is selected from the group consisting of alkyl acrylate, alkyl methacrylate, and mixtures thereof.

7. The polarizing plate of claim 1, wherein (b) the aromatic vinyl-based monomer is selected from the group consisting of styrene, methyl styrene, and mixtures thereof.

8. The polarizing plate of claim 1, wherein (c) the N-substituted maleimide-based monomer is selected from the group consisting of N-methyl maleimide, N-ethyl maleimide, N-n-propyl maleimide, N-isopropyl maleimide, N-n-butyl maleimide, N-s-maleimide, N-t-maleimide, N-n-hexyl maleimide, N-n-dodecyl maleimide, N-allyl maleimide, N-benzyl maleimide, N-cyclohexyl maleimide, N-phenyl maleimide, N-nitrophenyl maleimide, N-hydroxymaleimide, N-methoxymaleimide, N-ethoxymaleimide, N-monochlorophenyl maleimide, N-dichlorophenyl maleimide, N-monomethylphenyl maleimide, N-dimethylphenyl maleimide, and N-ethylphenyl maleimide.

9. The polarizing plate of claim 1, wherein (c) the N-substituted maleimide-based monomer is selected from the group consisting of N-cyclohexyl maleimide and N-phenyl maleimide.

10. The polarizing plate of claim 1, wherein the polarizing plate has a thickness of 60 μm to 70 μm.

11. The polarizing plate of claim 1, wherein the polarizing plate further comprises an adhesive layer between the polyvinyl alcohol polarizer and the hardening resin layer.

12. The polarizing plate of claim 1, wherein the hardening resin layer is formed directly on the polyvinyl alcohol polarizer.

13. An image display device comprising the polarizing plate of claim 1.

14. A method for manufacturing a polarizing plate, comprising:
   a) preparing (A) a photocurable acrylic polymer comprising (a) an acrylate-based monomer, (b) an aromatic vinyl-based monomer, and (c) an N-substituted maleimide-based monomer comprising an acryloyl functional group;
   b) preparing a photocurable composition comprising: 4 to 95 parts by weight of (A) the photocurable acrylic polymer, 4 to 95 parts by weight of (B) a poly-functional acrylic monomer, and 1 to 20 parts by weight of (C) a photo-polymerization initiator, based on 100 parts by weight of the photocurable composition; and
   c) using the prepared photocurable composition to directly form a hardening resin layer on at least one side of a polyvinyl alcohol polarizer,
   wherein (A) the photocurable acrylic polymer comprises 30 to 98 parts by weight of (a) the acrylate-based monomer based on 100 parts by weight of (A) the photocurable acrylic polymer,
   wherein (A) the photocurable acrylic polymer comprises 1 to 30 parts by weight of (b) the aromatic vinyl-based monomer based on 100 parts by weight of (A) the photocurable acrylic polymer, and
   wherein (A) the photocurable acrylic polymer comprises 1 to 40 parts by weight of (c) the N-substituted maleimide-based monomer based on 100 parts by weight of (A) the photocurable acrylic polymer.

15. A method for manufacturing a polarizing plate, comprising:
   a) preparing a photocurable acrylic polymer comprising (A) (a) an acrylate-based monomer, (b) an aromatic vinyl-based monomer, and (c) an N-substituted maleimide-based monomer comprising an acryloyl functional group;
   b) preparing a photocurable composition comprising: 4 to 95 parts by weight of (A) the photocurable acrylic polymer, 4 to 95 parts by weight of (B) a poly-functional acrylic monomer, and 1 to 20 parts by weight of (C) a photo-polymerization initiator, based on 100 parts by weight of the photocurable composition; and
   c) including an adhesive layer to form a hardening resin layer prepared from the prepared photocurable composition on at least one side of a polyvinyl alcohol polarizer,
   wherein (A) the photocurable acrylic polymer comprises 30 to 98 parts by weight of (a) the acrylate-based monomer based on 100 parts by weight of (A) the photocurable acrylic polymer,
   wherein (A) the photocurable acrylic polymer comprises 1 to 30 parts by weight of (b) the aromatic vinyl-based monomer based on 100 parts by weight of (A) the photocurable acrylic polymer, and
   wherein (A) the photocurable acrylic polymer comprises 1 to 40 parts by weight of (c) the N-substituted maleimide-based monomer based on 100 parts by weight of (A) the photocurable acrylic polymer.

* * * * *